(12) United States Patent
Iwami

(10) Patent No.: US 6,689,860 B2
(45) Date of Patent: Feb. 10, 2004

(54) SOLID GOLF BALL

(75) Inventor: Satoshi Iwami, Kobe (JP)

(73) Assignee: Sumitomo Rubber Industries Limited, Kobe (JP)

( * ) Notice: Subject to any disclaimer, the term of this patent is extended or adjusted under 35 U.S.C. 154(b) by 44 days.

(21) Appl. No.: 09/995,623

(22) Filed: Nov. 29, 2001

(65) Prior Publication Data

US 2002/0098917 A1 Jul. 25, 2002

(30) Foreign Application Priority Data

Dec. 28, 2000 (JP) .................................... 2000-402502

(51) Int. Cl.$^7$ .................... A63B 37/00; A63B 37/12; C08G 18/32
(52) U.S. Cl. ........................ 528/64; 528/63; 473/373; 473/374; 473/378
(58) Field of Search ................... 528/63, 64; 473/373, 473/374, 378

(56) References Cited

U.S. PATENT DOCUMENTS

| 5,334,673 A | | 8/1994 | Wu |
| 5,752,889 A | | 5/1998 | Yamagishi et al. |
| 6,117,024 A | * | 9/2000 | Dewanjee |
| 6,486,261 B1 | * | 11/2002 | Wu |

* cited by examiner

*Primary Examiner*—David J. Buttner

(57) ABSTRACT

There is provided a solid golf ball comprising a multi-piece core and a cover made from polyurethane obtained by curing an isocyanate group-terminated urethane prepolymer including a residual polyisocyanate monomer content of not more than 0.1% by mass using an aromatic polyamine curing agent. The golf ball satisfies moldability of the polyurethane cover and durability, and exhibits excellent ball characteristic such as flight performance and shot feeling.

13 Claims, 1 Drawing Sheet

SOLID GOLF BALL

BACKGROUND OF THE INVENTION

1. Field of the Invention

The present invention relates to a multi-piece solid golf ball comprising a multi-layered core and a polyurethane cover covering the core.

2. Description of the Related Art

A conventional solid golf ball has a solid core made from vulcanized rubber and an ionomer resin cover because an ionomer resin cover exhibits superior durability. Golf balls with ionomer resin covers, however, give golfers a larger impact upon shot than golf balls with Balata rubber covers and hence are likely to impart the golfers with inferior shot feeling.

In attempt to improve the shot feeling imparted by golf balls with the ionomer covers, Japanese Patent No. 2709950, for example, has proposed a cover made from a mixture of a hard ionomer such as a sodium salt or zinc salt of an olefin-unsaturated carboxylic acid copolymer and a soft ionomer such as a sodium salt or zinc salt of an olefin-unsaturated carboxylic acid-unsaturated carboxylic acid ester terpolymer. The cover makes it possible to render the shot feeling soft due to the soft ionomer in the cover material, but on the other hand, impairs the merits inherent to ionomer covers; for example, the repulsion property as well as the scuff resistance of the golf ball lowers.

In recent years, polyurethane is receiving attention as an inexpensive cover material that imparts to golfers a shot feeling analogous to a shot feeling imparted by the Balata cover and has higher durability than the Balata cover. U.S. Pat. No. 5,334,673, for example, has disclosed a polyurethane cover formed by curing a urethane prepolymer with a slow-reactive polyamine curing agent. Also, Japanese Patent Laid-Open Gazette No. HEI 9-215778 has proposed a cover made from thermoplastic polyurethane.

Polyurethane used as a cover material involves a problem that it makes the molding of a cover difficult because the curing reaction between a urethane prepolymer and a polyamine proceeds rapidly, which causes a steep increase in viscosity. The U.S. Pat. No. 5,334,673 has solved the problem by the use of a slow-reactive polyamine and/or a glycol. In the art of the publication, however, there are some cases depending on kinds of urethane prepolymer, curing agent, and/or combinations thereof in which an increase in viscosity is still rapid and makes the molding of a cover difficult. Even though a polyurethane cover is obtained by molding, a golf ball with the resulting cover is not sufficient in terms of repulsion property, spin performance and scuff resistance. Thus, further improvements with respect to a thermosetting type polyurethane cover are desired.

Thermoplastic polyurethane elastomers used as cover materials are superior in moldability to thermosetting polyurethane covers, but are inferior in wear resistance, tear strength and scuff resistance to thermosetting polyurethane covers or hard ionomer covers because of the lack of three-dimensionally crosslinking points.

SUMMARY OF THE INVENTION

An object of the present invention is to provide a solid golf ball with a cover made from polyurethane which is satisfactory in moldability and ball characteristics.

A solid golf ball of the present invention comprises a solid core comprising a solid center made from vulcanized rubber and an intermediate layer covering the solid center, and an cover covering the solid core. The cover has an outermost layer made from polyurethane obtained by curing a composition comprising an isocyanate group-terminated urethane prepolymer and an aromatic polyamine curing agent. The isocyanate group-terminated urethane prepolymer has a residual polyisocyanate monomer content of not more than 0.1% by mass.

The foregoing and other objects, features and attendant advantages of the present invention will become apparent from the reading of the following detailed description.

DETAILED DESCRIPTION OF THE PREFERRED EMBODIMENTS

Figure 1:
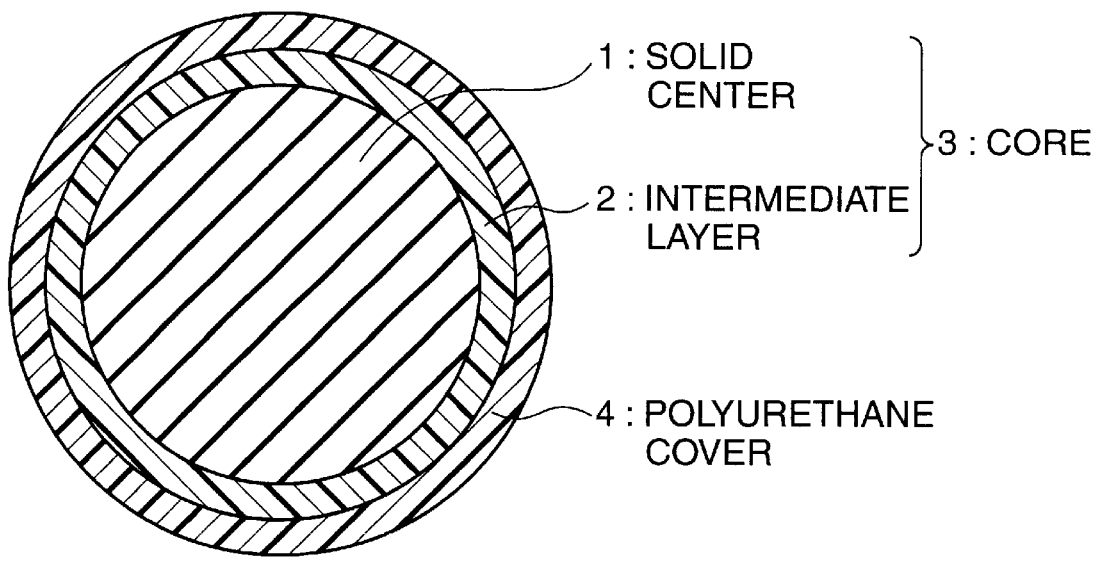
FIG. 1 is a schematic view showing the appearance of a golf ball according to the present invention.

The present invention will now be described in detail.

According to the solid golf ball of the present invention, as shown in FIG. 1, a solid core 3 is covered with a specific polyurethane cover 4. The core 3 comprises a solid center 1 and an intermediate layer 2 placed on the center 1.

The polyurethane cover is formed by curing a composition comprising an aromatic polyamine curing agent and an isocyanate group-terminated urethane prepolymer. The isocyanate group-terminated urethane prepolymer contains a residual polyisocyanate monomer in an amount of not more than 0.1% by mass.

The "isocyanate group-terminated urethane prepolymer" of the invention means a urethane prepolymer has at least two isocyanate groups in its molecular chain. Each isocyanate group may be located at the terminal of the backbone chain of the molecular chain or at the terminal of a side chain of the urethane prepolymer. The isocyanate group-terminated urethane prepolymer is prepared by a reaction between a polyol and a polyisocyanate compound in a state where the isocyanate group of the polyisocyanate compound is excessive relative to the hydroxyl group of the polyol in molar ratio.

The "residual polyisocyanate monomer", as used herein, means an unreacted polyisocyanate compound remaining in the isocyanate group-terminated urethane prepolymer. The content of the residual polyisocyanate monomer in the isocyanate group-terminated urethane prepolymer is defined by the expression: (the mass of the residual polyisocyanate monomer/the mass of the isocyanate group-terminated urethane prepolymer including the residual polyisocyanate monomer and the like)×100 and can be determined by gas chromatography. If the content of the residual polyisocyanate monomer is more than 0.1% by mass, a precipitate is likely to occur in the urethane cover composition before finishing the curing reaction. Though the mechanism of occurrences of the precipitate is not clearly known, it can be presumed that the residual polyisocyanate monomer reacts with the polyamine curing agent to precipitate the reaction product. Such precipitation causes uneven reaction between the isocyanate group-terminated urethane prepolymer and the polyamine curing agent, resulting in a difficulty in the manufacture of a homogeneous polyurethane cover. A heterogeneous polyurethane cover has affected durability, particularly a lowered scuff resistance. In an extreme case, the composition for a cover is cured before forming a cover, which makes the molding of the cover substantially impossible.

Examples of the polyisocyanate compounds for use as raw materials of isocyanate group-terminated urethane prepolymers include, without any particular limitation, aromatic diisocyanates such as TDI (toluene 2,4-diisocyanate, toluene 2,6-diisocyanate, or a mixture thereof), MDI (4,4'-diphenylmethane diisocyanate or a polynuclear compound thereof), 1,5-naphthylene diisocyanate (NDI), 3,3'-bitolylene-4,4'-diisocyanate (TODI), xylylene diisocyanate (XDI) and paraphenylene diisocyanate (PPDI); and alicyclic diisocyanates or aliphatic diisocyanates such as 4,4'-dicyclohexylmethane diisocyanate (hydrogenated MDI), hexamethylene diisocyanate (HDI) and isophorone diisocyanate (IPDI), or mixtures of one or two or more of them. Among them, TDI or hydrogenated MDI is preferably used because a resulting polyurethane cover has favorable mechanical properties and a golf ball with the resulting polyurethane cover is satisfactory in repulsion property, weatherability and water resistance.

Any polyol having a plurality of hydroxyl groups may be used as a raw material of the isocyanate group-terminated urethane prepolymer regardless of whether it is a low-molecular-weight compound or a high-molecular-weight compound. Examples of the low-molecular-weight polyols include diols such as ethylene glycol, diethylene glycol, triethylene glycol, 1,3-butanediol, 1,4-butanediol, neopentyl glycol, and 1,6-hexanediol; and triols such as glycerin, trimethylolpropane, and hexanetriol. Examples of the high-molecular-weight polyols include polyether polyols generally resulting from the reaction between an initiator having active hydrogen and alkylene oxide; condensed polyester polyols generally resulting from the dehydro-condensation between a dibasic acid such as adipic acid, and a glycol or a triol; lactone polyester polyols generally resulting from ring opening polymerization of a lactam such as $\epsilon$-caprolactam; polycarbonate diols generally synthesized using a cyclic diol; and polymer polyols such as an acrylic polyol prepared by introducing an appropriate hydroxyl group into an acrylic copolymer. Examples of specific polyether polyols include polyoxyethylene glycol, polyoxypropylene glycol (PPG), and polyoxytetramethylene ether glycol (PTMG). Examples of specific condensed polyester polyols include polyethylene adipate (PEA), polybutylene adipate (PBA), and polyhexamethylene adipate (PHMA). Examples of specific lactone polyester polyols include poly-$\epsilon$-caprolactone (PCL). In view of their superior repulsion property and water resistance, polyether polyols are preferable. Use of polyoxytetramethylene ether glycol is particularly preferable.

Accordingly, one selected from the group consisting of a TDI-type urethane prepolymer, an MDI-type urethane prepolymer and a hydrogenated MDI-type urethane prepolymer is preferably used as the isocyanate group-terminated urethane prepolymer. Specifically, use of a TDI-type urethane prepolymer, an MDI-type urethane prepolymer, a hydrogenated MDI-type urethane prepolymer, a mixture of a TDI-type urethane prepolymer and hydrogenated MDI-type urethane prepolymer, or the like is preferable.

The "TDI-type urethane prepolymer", as used herein, means an isocyanate group-terminated urethane prepolymer resulting from the reaction between a TDI or a polyisocyanate compound comprising a TDI as a major component and a polyol (preferably polytetramethylene ether glycol). The "MDI-type urethane prepolymer", as used herein, means an isocyanate group-terminated urethane prepolymer resulting from the reaction between an MDI or a polyisocyanate compound comprising an MDI as a major component and a polyol (preferably polytetramethylene ether glycol). The "hydrogenated MDI-type urethane prepolymer", as used herein, means an isocyanate group-terminated urethane prepolymer resulting from the reaction between a hydrogenated MDI or a polyisocyanate compound comprising a hydrogenated MDI as a major component and a polyol (preferably polytetramethylene ether glycol).

Specific examples of the isocyanate group-terminated urethane prepolymer having a residual polyisocyanate monomer content of not more than 0.1% by mass includes Adiprene LF900A and LF950A available from UNIROYAL CHEMICAL.

The aromatic polyamine curing agent used in the present invention is a compound having at least two amino groups bonded to aromatic ring(s). Such a compound may be of a phenylenediamine type in which two or more amino groups are bonded to one aromatic ring or of a polyaminobenzene type that contains two or more aminophenyl groups in each of which one amino group is bonded to one aromatic ring. Polyaminobenzene-type compounds are preferable because they have less influence of amino groups upon each other or less influence of steric hindrance. Such a polyaminobenzene-type compound may be diaminobenzene in which two aminophenyl groups are directly bonded to each other or may be such that two aminophenyl groups are bonded to each other through a lower alkylene group or an alkylene oxide group. Among them, diaminodiphenylalkane having two aminophenyl groups bonded to each other through a lower alkylene group. Particularly preferable are 4,4'-diaminodiphenylmethane represented by the following general formula or derivatives thereof. In the case where the compound is of p-form and having a not very long molecular chain intervening between aminophenyl groups, benzene nuclei forming hard segments can be arranged side-by-side linearly on a plane and, hence, it is possible to efficiently make use of urethane bond, urea bond, hydrogen bond between benzene nuclei or intermolecular cohesive energy, thus resulting in improvements in repulsion property, tensile strength and tear strength. For this reason, a resulting cover tends to be improved in cover strength such as scuff resistance, and cover durability.

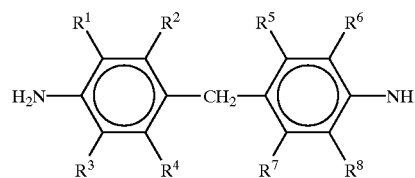

$R^1$ to $R^8$ each represent any one of an alkyl group having 1 to 9 carbon atoms, a halogen atom or a hydrogen atom.

Specific examples of such alkyl group having 1 to 9 carbon atoms include straight-chain alkyl groups such as methyl, ethyl, n-propyl, n-butyl, n-pentyl, n-hexyl, n-heptyl, n-octyl, and n-nonyl; branched-chain alkyl groups such as i-propyl, i-butyl, sec-butyl, t-butyl, and neopentyl; and alicyclic alkyl groups such as cyclopropyl and cyclohexyl. Among them, methyl and ethyl are preferable as they involve less steric hindrance. Examples of such halogen atoms include fluorine, chlorine, bromine, and iodine. Among them, chlorine and bromine are preferable. $R^1$ to $R^8$ may be different alkyl groups or different halogen atoms. Examples of derivatives of 4,4'-diaminodiphenylmethane include 3,3'-dichloro-4,4'-diaminodiphenylmethane, 3,3'-dimethyl-5,5'-diethyl-4,4'-diaminodiphenylmethane, 3,3', 5,5'-tetramethyl-4,4'-diaminodiphenylmethane, 3,3', 5,5'- tetraethyl-4,4'-diaminodiphenylmethane, 3,3', 5,5'-tetraisopropyl-4,4'-diaminodiphenylmethane, 3,3'-dimethyl-5,5'-diisopropyl-4,4'-diaminodiphenylmethane, 3,3'-diethyl-5,5'-diisopropyl-4,4'-diaminodiphenylmethane, 3,3'-dimethyl-5,5'-di-t-butyl-4,4'-diaminodiphenylmethane, 3,3'-dichloro-5,5'-diethyl-4,4'-diaminodiphenylmethane, 2,2'-dichloro-3,3',5,5'-tetraethyl-4,4'-diaminodiphenylmethane, and 2,2',3,3'-tetrachloro-4,4'-diaminodiphenylmethane. Among them, 2,2'-dichloro-3,3',5,5'-tetraethyl-4,4'-diaminodiphenylmethane is particularly preferable because its toxicity is low.

Though the amount of the aromatic polyamine curing agent in the composition used for the cover is not particularly limited, preferably the aromatic polyamine curing agent is blended with the isocyanate group-terminated urethane prepolymer so that the molar ratio of amino group of the polyamine respective to isocyanate group of the urethane prepolymer, namely $NH_2/NCO$, is 0.85 to 1.15.

The composition used for the cover in the present invention may contain any conventionally known catalyst for use in a curing reaction between polyisocyanate and polyamine. Examples of such catalysts include monoamines such as triethylamine and N,N-dimethylcyclohexylamine; polyamines such as N,N,N',N'-tetramethylethylenediamine and N,N,N',N'',N''-pentamethyldiethylenetriamine; cyclic diamines such as 1,8-diazabicyclo-[5,4,0]-7-undecene (DBU) and triethylenediamine; organic carboxylic acids such as azelaic acid, oleic acid, and adipic acid; and tin catalysts such as dibutyltin dilaurylate and dibutyltin diacetate. Among them, azelaic acid is preferably used.

As required, the composition for cover may contain, in addition to the isocyanate group-terminated urethane prepolymer and the aromatic polyamine curing agent, a filler such as barium sulfate, a coloring agent such as titanium dioxide, and other additives such as a dispersant, antioxidant, ultraviolet absorber, light stabilizer, fluorescent material, and fluorescent brightener unless they impair any desired property to be imparted to an intended golf ball by a resulting cover.

With respect to the cover of the golf ball according to the present invention, the hardness of the cover material polyurethane alone (the hardness of the material itself may be referred to as "slab hardness") is preferably not less than 35, more preferably not less than 40, much more preferably not less than 43, in terms of Shore D hardness. If the hardness is less than 35, the resulting cover is so soft that a golf ball with this cover is easy to spin and hence exhibits a lowered repulsion property and that the cover exhibits too low a scuff resistance (scuff resistance) when hit with an iron or a sand wedge. Since a polyurethane having a higher slab hardness gives a harder cover, too high a slab hardness results in a golf ball which offers a harder shot feeling and which cannot ensure satisfactory controllability in approach shots due to the spin rate decreased too much. For this reason, the upper limit of the slab hardness (Shore D hardness) of the cover material polyurethane is preferably 60, more preferably 55, much more preferably 52.

The isocyanate group-terminated urethane prepolymer and the aromatic polyamine curing agent need to react in a state that they are homogeneously mixed. It is therefore preferable to mix the melted polyamine compound with the urethane prepolymer which is heated to a temperature close to the temperature of the melted polyamine, and inject the mixture into a mold heated to a temperature close to the mixing temperature.

The solid core used in the present invention is a multi-piece solid core formed by covering a solid center of a vulcanized rubber sphere with at least one intermediate layer.

Employing such a multi-piece solid core can provide a difference in hardness between a central portion and a surface portion of the core more easily than the case of adjustment of the difference in hardness between a central portion and a surface portion of a single-layered core. Further, by adjusting the respective compositions and thicknesses of the solid center and the intermediate layer, it is possible to widen the freedom of hardness distribution and hence to provide a considerably large difference in hardness between the solid core center (i.e. central point of the solid center) and the solid core surface (i.e. surface of the outermost intermediate layer). By varying the respective materials of the solid center and the intermediate layer, it is possible to optimize a spin rate of a resulting golf ball. For the reasons stated above, it is possible to combine a polyurethane cover with a solid core having a hardness distribution that is suited to the sort of the polyurethane cover. Comparing a multi-piece solid core with a single-layered core having a substantially equal hardness (deformable amount) to one of the multi-piece core as its entirety, a multi-piece solid core may provide a golf ball exhibiting more excellent flying performance suited for various clubs. For example, a golf ball with such a multi-piece solid core can realize a higher shot angle and a smaller spin rate when hit with a driver or an iron while ensuring an adequate spin rate when hit with a sand wedge.

A multi-piece solid core suitably combined with the aforementioned polyurethane cover has the following structure.

Next, the solid core used in the inventive golf ball will be described.

The solid center is made of vulcanized rubber sphere and forms a core portion of the multi-piece solid core. The preferable solid center has an outer diameter of not less than 30.0 mm, more preferably not less than 31.0 mm, much more preferably not less than 32.0 mm. The upper limit of the outer diameter of the solid center is preferably 41.0 mm, more preferably 40.8 mm, much more preferably 40.8 mm. If the center has an outer diameter of less than 30.0 mm is too small, it is difficult to provide a desired difference in hardness between the central point and the surface of the solid center. On the other hand, if the outer diameter of the solid center is more than 41.0 mm, the intermediate layer and the cover are required to be thin because the size of a golf ball is prescribed, resulting in a difficulty in molding.

The solid center is preferably made to become softer as it extends toward the central point thereof. The difference in Shore D hardness between the central point and the surface of the solid center is preferably not less than 10 and not more than 25, more preferably not less than 12 and not more than 20. The amount of deformation of the solid center applied with a load varying from 10 kgf as an initial load to 130 kgf as a final load, which serves an indication of the softness of the whole solid center, is preferably not less than 2.80 mm and not more than 6.00 mm, more preferably not less than 2.90 mm and not more than 5.5 mm, much more preferably not more than 5.0 mm.

By adjusting the difference in hardness between the central point and the surface of the solid center and the amount of deformation of the solid center so as to fall within the respective ranges stated above, it is possible to enhance the repulsion property of the resulting golf ball as well as to ensure a soft shot feeling when the ball is hit with a wood or an iron.

Any solid center satisfying the foregoing requirements may be used in the present invention. Specifically, the hardness of the central portion of the solid center is preferably from 25 to 40, more preferably from 28 to 38, while the hardness of the surface of the solid center is preferably from 35 to 50, more preferably from 38 to 48.

The rubber composition for the solid center may be any rubber composition generally used for the core of a conventional solid golf ball. Specifically, such a rubber composition comprises a diene rubber such as butadiene rubber (BR), ethylene-propylene-diene terpolymer (EPDM), isoprene rubber (IR), styrene-butadiene rubber (SBR), or acrylonitrile-butadiene rubber (NBR); an unsaturated carboxylic acid and/or a metal salt thereof as a co-crosslinking agent; an organic peroxide as a crosslinking initiator; and optionally other additives such as a specific gravity adjustor.

Examples of the organic peroxides include dicumyl peroxide, 1,1-bis(t-butylperoxy)-3,5-trimethylcyclohexanei, 2,5-dimethyl-2,5-di(t-butylperoxy)hexane, and di-t-butyl peroxide. Among them, dicumyl peroxide is preferably used. The amount of the organic peroxide to be blended is preferably from 0.1 to 3.0 parts by mass, more preferably from 0.2 to 2.0 parts by mass, based on 100 parts by mass of the diene rubber.

Preferable as the unsaturated carboxylic acid is an α, β-unsaturated carboxylic acid having 3 to 8 carbon atoms such as an acrylic acid or a methacrylic acid. A preferable metal salt of the unsaturated carboxylic acid is a monovalent or bivalent metal salt such as a zinc salt or magnesium salt. The amount of the unsaturated carboxylic acid and/or a metal salt thereof is preferably from 15 to 40 parts by mass, particularly from 20 to 35 parts by mass, based on 100 parts by mass of the diene rubber.

The vulcanization conditions for the rubber composition are appropriately established depending on the formulation of the rubber composition. Preferably vulcanization is performed at 160° C. to 180° C. for 10 to 25 minutes to obtain a solid center satisfying the foregoing hardness conditions.

The intermediate layer in a state that covers the solid center to form a multi-piece solid core satisfies the following conditions. Specifically, the diameter of such a multi-piece solid core is preferably not less than 39.0 mm and not more than 41.8 mm, more preferably not less than 39.6 mm and not more than 41.6 mm, much more preferably not less than 40.0 mm and not more than 41.0 mm. The amount of deformation of the multi-piece solid core applied with a load varying from 10 kgf as an initial load to 130 kgf as a final load is preferably not less than 2.70 mm, more preferably 2.80 mm, much more preferably 2.90 mm. The upper limit of the amount of deformation is preferably 3.50 mm, more preferably 3.40 mm, much more preferably 3.30 mm. Such a core having a larger diameter and larger variation in hardness may provide a golf ball that exhibits a reduced spin rate, hence an enhanced repulsion property thereby ensuring a satisfactory flight distance without impairing the softness when hit with a wood or an iron while ensuring a required spin rate when hit with a sand wedge. If the core diameter is less than 39.0 mm, the intermediate layer is required to be thin due to the relation to the solid center, which makes it difficult to provide an effect. Besides, the cover is required to be thick. As a result, a golf ball easily spins and exhibits too low a repulsion property. On the other hand, if it is more than 41.6 mm, the cover is required to be thin, which results in a difficulty in molding.

The amount of deformation of the core is an indication of the softness of the whole core. Even if the hardness of the core surface is increased, the resulting golf ball can impart a soft shot feeling to the golfer without impairing a repulsion property so long as the amount of deformation is adjusted to fall within the aforementioned range.

The intermediate layer used in the present invention may be any intermediate layer that can provide a multi-piece solid core satisfying the aforementioned requirements. The intermediate layer may be made from a vulcanized rubber, a resin such as an ionomer or a thermoplastic elastomer, or a mixture of a rubber and a resin. In order that the solid center and the core satisfy the foregoing respective requirements, the thickness of the intermediate layer is preferably from 0.4 to 9.0 mm, more preferably from 0.5 to 5.0 mm, much more preferably 0.5 to 4.0 mm. If the thickness of the coating layer is less than 0.4 mm, a difficulty arises in molding. If it is more than 9.0 mm, a resulting solid core is likely to have a lower repulsion property than a single-layered solid core made from vulcanized rubber unless the intermediate layer is formed of a vulcanized rubber.

According to the present invention, the amount of deformation of the golf ball is preferably not less than 2.50 mm, more preferably 2.60 mm, much more preferably 2.70 mm when applied with a load varying from 10 kgf as an initial load to 130 kgf as a final load. The upper limit of the amount of deformation is preferably 3.30 mm, more preferably 3.20 mm, much more preferably 3.10 mm. A golf ball of which the amount of deformation is less than 2.50 mm is so hard that the golfer hitting this ball receives too large an impact. On the other hand, a golf ball of which the amount of deformation is more than 3.30 mm is so soft that the length of time from the moment the ball is hit to the moment the ball departs from the face of the club is prolonged and hence the golfer feels the ball heavy.

The solid golf ball of the present invention may be manufactured by a process conventionally known as a process for manufacturing a golf ball covered with a hard polyurethane cover. Specifically, a cover composition is injected into a hemispherical mold holding therein the core and then the mold is inverted and jointed with another hemispherical mold into which a polyurethane cover composition has been injected, to form a golf ball with a polyurethane cover.

As required, the surface of the polyurethane cover is formed with a multiplicity of dimples during the molding of the cover. Further, the golf ball of the present invention is usually provided with paint finish, a marking stamp and the like to enhance the appearance and commercial value thereof before it is put on the market.

It is to be noted that the cover of the golf ball of the present invention may comprise a single layer or plural layers.

According to the present invention, the solid golf ball has a polyurethane cover formed using a urethane prepolymer having a residual polyisocyanate monomer content of not more than 0.1% by mass and hence is excellent in scuff resistance and durability. Further, since the solid golf ball has a multi-layered core which allows the hardness distribution thereof and the amount of deformation thereof to be adjusted to fall within respective appropriate ranges, the ball can exhibit superior flying performance when hit with any one of various clubs such as a wood, iron and sand wedge.

EXAMPLES

Hereinafter, the present invention will be more specifically described by way of examples, which are, in no way, construed as limitative of the present invention.

Measurement and Evaluation Methods

1. Amount of Compressive Deformation (mm)

The amount of deformation of a solid center, a core or a golf ball by compressing on condition that an initial load of 10 kgf is increased to an ultimate load of 130 kgf was measured.

2. Shore D Hardnesses of the Central Point and the Surface of a Solid Center, and the Surface of a Core Measurement was performed using a Shore D type spring hardness tester prescribed by ASTM-D2240.

The solid center was divided into two hemispherical halves and the hardness of one of the hemispherical halves was measured by pressing a pick against the central point of the halves. The hardness of the surface of the solid center was measured by pressing the pick against the surface of the solid center. The hardness of the surface of the core was measured by pressing the pick against the surface of the core in a state where the solid center was covered with the intermediate layer.

3. Hardness of a Cured Product of a Cover Composition (Slab Hardness)

The composition prepared for cover was formed into sheets each having a thickness of about 2 mm by hot press molding and the resulting sheets were conserved at 23° C. for two weeks. Three or more of the sheets were stacked on one another to prevent the substrate or the like used in the measurement from influencing the measurement and the stack was subjected to measurement using the Shore D type spring hardness tester prescribed by ASTM-D2240.

4. Flying Performance of a Golf Ball

A golf ball was hit with a wood (W#1) attached to a swing robot manufactured by True Temper Co., Ltd. at a head speed of 50 m/sec. The shot angle (°), spin rate (rpm) and flight distance (the distance (m) from the hitting point to the point at which the ball stopped after its falling to the ground) of the golf ball thus hit were measured.

In turn, the golf ball was hit with an iron (I#5) attached to the swing robot instead of the wood at a head speed of 41 m/sec. The shot angle (°), spin rate (rpm) and flight distance (the distance (m) from the hitting point to the point at which the ball stopped after its falling to the ground) of the golf ball thus hit were measured.

Thereafter, the golf ball was hit with a sand wedge (SW) attached to the swing robot instead of the iron at a head speed of 21 m/sec. The spin rate (rpm) of the golf ball thus hit was measured.

5. Scuff Resistance

Two portions of a golf ball were each hit once using a commercially available pitching wedge attached to the swing robot at a head speed of 36 m/sec. The condition of each of the two portions thus hit was visually observed and rated into three categories according to the following criteria. The lower one of the two ratings was regarded as the rating of the golf ball.

Category "◯": a ball surface with few flaws left to an unnoticeable degree.

Category "Δ": a ball surface with clearly noticeable flaws and with slight napping observed.

Category "X": a ball surface considerably shaved and conspicuously napped.

Manufacture of Golf Ball

Each of solid center rubber compositions (C1 to C4) of the formulation shown in Table 1 was subjected to vulcanizing molding at 170° C. for 15 minutes, to form a solid center.

The solid center thus formed was covered with an intermediate layer composition (H1 or H2) shown in Table 2, to form a double-layered core.

The core thus formed was covered with each of cover compositions (P1 to P6) shown in Table 3 by a molding process, to form a golf ball having a diameter of 42.8 mm.

TABLE 1

| Solid center composition | C1 | C2 | C3 | C4 |
|---|---|---|---|---|
| BR-18 | 100 | 100 | 100 | 100 |
| Zinc acrylate | 32 | 30 | 30 | 28 |
| Zinc white | 12.0 | 13.0 | 21.0 | 17.0 |
| Diphenyl disulfide | 0.5 | 0.5 | 0.5 | 0.5 |
| Dicumyl peroxide | 1.0 | 1.0 | 1.0 | 1.0 |

In Table 1, BR-18 is a high-cis-polybutadiene produced by JSR Co., Ltd. used as a butadiene rubber; diphenyl disulfide is a product of Sumitomo Seika Co., Ltd. and dicumyl peroxide is a product of NOF CORPORATION.

TABLE 2

| Intermediate Layer | H1 | H2 |
|---|---|---|
| BR-11 | 80 | — |
| BR-10 | 20 | — |
| Zinc acrylate | 38 | — |
| Zinc oxide | 10.5 | — |
| Dicumyl peroxide | 0.5 | — |
| Himilan 1605 | — | 60 |
| Himilan 1706 | — | 40 |

In Table 2, BR-11 and BR-10 are polybutadiene rubbers produced by JSR Co., Ltd.; Himilan 1605 is a sodium ion-neutralized ethylene-methacrylic acid type ionomer resin produced by Mitui-DuPont Polychemical Co., Ltd; and Himilan 1706 is a zinc ion-neutralized ethylene-methacrylic acid type ionomer resin produced by Mitui-DuPont Polychemical Co., Ltd.

TABLE 3

| Cover composition | P1 | P2 | P3 | P4 | P5 | P6 |
|---|---|---|---|---|---|---|
| Urethane prepolymer | | | | | | |
| Adiprene LF900A | 80 | 80 | — | — | — | — |
| Adiprene LF950A | 20 | 20 | — | — | — | — |
| Adiprene L100 | — | — | 100 | — | — | — |
| Vibrathane B635 | — | — | — | 100 | — | — |
| Curing agent | | | | | | |
| Lonzacure M-CDEA | 17.8 | — | 17.9 | — | — | — |
| Elasmer-250P | — | 21.7 | — | — | — | — |
| 1,4-butanediol | — | — | — | 7.9 | — | — |
| Elastomer | | | | | | |
| Pandex T1198 | — | — | — | — | 100 | — |
| Surlyn 8120 | — | — | — | — | — | 50 |
| Himilan AM7316 | — | — | — | — | — | 50 |
| Titanium oxide | 2 | 2 | 2 | 2 | 2 | 2 |
| Curing time (min) | 10 | 15 | 10 | 20 | — | — |
| Mold temperature (° C.) | 100 | 100 | 100 | 10 | — | — |
| Prepolymer temperature (° C.) | 80 | 80 | 80 | 80 | — | — |
| Curing agent temperature (° C.) | 120 | 120 | 50 | 60 | — | — |
| Slab hardness (Shore D) | 43 | 44 | 42 | 43 | 42 | 43 |

In Table 3, Adiprene LF900A is a TDI(NCO content= 3.7%)-PTMG type prepolymer having a free TDI content of not more than 0.1% produced by UNIROYAL CHEMICAL; Adiprene LF950A is a TDI(NCO content=6.1%)-PTMG type prepolymer having a free TDI content of not more than 0.1% produced by UNIROYAL CHEMICAL; Vibrathane B635 is a MDI(NCO content=7.5%)-PTMG type prepolymer having a free MDI content of more than 0.1% produced by UNIROYAL CHEMICAL; Adiprene L100 is a TDI(NCO content=4.1%)-PTMG type prepolymer having a free TDI content of more than 0.1% produced by UNIROYAL CHEMICAL; Lonzacure M-CDEA is 4,4'-methylenebis(3-chloro-2,6-diethylaniline) having an amine number of 297 mgKOH/g produced by UNIROYAL CHEMICAL; Elasmer 250P is polytetramethylene oxide aminobenzoate having an amine value of 249.4 mgKOH/g produced by AIR PRODUCTS CO.; Pandex T1198 is an adipate-type thermoplastic polyurethane elastomer produced by Dainippon Ink & Chemicals; Surlyn 8120 is an Na ion-neutralized methacrylic acid type three-component ionomer produced by Dupont Co., Ltd.; and Himilan AM7316 is an Mg ion-neutralized methacrylic acid type three-component ionomer produced by Mitui-DuPont Polychemichal Co., Ltd.

The structures and characteristics of golf balls manufactured as Examples Nos. 1 to 9 of the present invention are collectively shown in Table 4, while the structures and characteristics of golf balls manufactured as Comparative Examples Nos. 1 to 5 are shown in Table 5.

It should be noted that Comparative Example No. 5 was a golf ball having a single-layered core formed from solid center composition C1.

TABLE 4

| Example ball No | 1 | 2 | 3 | 4 | 5 | 6 | 7 | 8 | 9 |
|---|---|---|---|---|---|---|---|---|---|
| Solid center | | | | | | | | | |
| Type of composition | C1 | C2 | C1 | C2 | C2 | C3 | C4 | C1 | C2 |
| Diameter (mm) | 33.8 | 37.8 | 33.2 | 37.2 | 37.2 | 37.2 | 39.6 | 32.8 | 36.8 |
| Amount of deformation (mm) | 4.55 | 3.70 | 4.50 | 3.65 | 3.65 | 3.65 | 3.45 | 4.45 | 3.60 |
| Hardness at center | 34 | 35 | 34 | 35 | 35 | 35 | 35 | 34 | 35 |
| Hardness at the surface | 45 | 47 | 45 | 47 | 47 | 47 | 50 | 50 | 47 |
| Difference in hardness | 11 | 12 | 11 | 12 | 12 | 12 | 15 | 16 | 12 |
| Intermediate layer | | | | | | | | | |
| Type of composition | H1 | H1 | H1 | H1 | H1 | H2 | H2 | H1 | H1 |
| Thickness (mm) | 4.0 | 2.0 | 4.0 | 2.0 | 2.0 | 2.0 | 0.8 | 4.0 | 2.0 |
| Diameter (mm) | 41.8 | 41.8 | 41.2 | 41.2 | 41.2 | 41.2 | 41.2 | 40.8 | 40.8 |
| Hardness at surface | 55 | 55 | 55 | 55 | 55 | 70 | 70 | 55 | 55 |
| Amount of deformation (mm) | 3.19 | 3.20 | 3.14 | 3.15 | 3.15 | 3.05 | 2.75 | 3.09 | 3.15 |
| Cover | | | | | | | | | |
| Type | P1 | P1 | P1 | P1 | P2 | P2 | P2 | P2 | P2 |
| Thickness (mm) | 0.5 | 0.5 | 0.8 | 0.8 | 0.8 | 0.8 | 0.8 | 1.0 | 1.0 |
| Slab hardness | 43 | 43 | 43 | 43 | 44 | 44 | 44 | 44 | 44 |
| Ball | | | | | | | | | |
| Amount of deformation (mm) | 2.99 | 3.00 | 2.90 | 2.92 | 2.93 | 2.83 | 2.53 | 2.84 | 2.85 |
| Initial velocity | 72.1 | 72.3 | 71.9 | 72.2 | 71.9 | 72.6 | 72.9 | 71.5 | 71.7 |
| Shot angle (W#1) | 9.9 | 10.0 | 9.8 | 9.8 | 9.7 | 9.7 | 9.8 | 9.7 | 9.7 |
| Spin rate (W#1) | 2200 | 2100 | 2300 | 2200 | 2300 | 2450 | 2400 | 2350 | 2300 |
| Flight distance (W#1) | 234 | 235 | 232 | 233 | 231 | 232 | 234 | 230 | 231 |
| Shot angle (I#5) | 12.6 | 12.7 | 12.5 | 12.5 | 12.4 | 12.5 | 12.6 | 12.4 | 12.4 |
| Spin Rate (I#5) | 4800 | 4700 | 4900 | 4800 | 4900 | 5000 | 4900 | 5000 | 4900 |
| Flight distance (I#5) | 194 | 195 | 192 | 193 | 192 | 192 | 194 | 190 | 191 |
| Spin rate (SW) | 7000 | 6980 | 7050 | 7000 | 7050 | 7100 | 7000 | 7100 | 7050 |
| Scuff resistance | ○ | ○ | ○ | ○ | Δ | ○ | ○ | ○ | ○ |

TABLE 5

| Comparative Ball No. | 1 | 2 | 3 | 4 | 5 |
|---|---|---|---|---|---|
| Solid center | | | | | |
| Type of composition | C2 | C2 | C2 | C2 | C2 |
| Diameter (mm) | 36.8 | 36.8 | 36.8 | 36.8 | 41.2 |
| Amount of deformation (mm) | 3.60 | 3.60 | 3.60 | 3.60 | 3.15 |
| Hardness at center | 35 | 35 | 35 | 35 | 34 |
| Hardness at the surface | 47 | 47 | 47 | 47 | 49 |
| Difference in hardness | 12 | 12 | 12 | 12 | 12 |
| Intermediate Layer | | | | | |
| Type of composition | H1 | H1 | H1 | H1 | — |
| Thickness (mm) | 2.0 | 2.0 | 2.0 | 2.0 | — |
| Core | | | | | |
| Diameter (mm) | 40.8 | 40.8 | 40.8 | 40.8 | 41.2 |
| Hardness at surface | 55 | 55 | 55 | 55 | 49 |
| Amount of deformation (mm) | 3.15 | 3.15 | 3.15 | 3.15 | 3.15 |
| Cover | | | | | |
| Type | P3 | P4 | P5 | P6 | P1 |
| Thickness (mm) | 1.0 | 1.0 | 1.0 | 1.0 | 1.0 |
| Slab hardness | 42 | 43 | 42 | 43 | 43 |
| Ball | | | | | |
| Amount of deformation (mm) | 2.92 | 2.91 | 2.91 | 2.89 | 2.93 |
| Initial velocity | 71.4 | 71.0 | 70.8 | 70.4 | 71.3 |
| Shot angle (W#1) | 9.6 | 9.5 | 9.5 | 9.4 | 9.2 |
| Spin rate (W#1) | 2400 | 2450 | 2500 | 2550 | 2600 |
| Flight distance (W#1) | 229 | 227 | 225 | 224 | 222 |
| Shot angle (I#5) | 12.3 | 12.2 | 12.1 | 12.1 | 11.9 |
| Spin rate (I#5) | 5050 | 5200 | 5300 | 5400 | 5500 |
| Flight distance (I#5) | 189 | 187 | 185 | 184 | 183 |
| Spin rate (SW) | 7050 | 7100 | 7400 | 7450 | 7500 |
| Scuff resistance | Δ | Δ | Δ | X | ○ |

Any one of Example golf balls Nos. 1 to 9 each comprising a double-layered core consisting of a solid center and an intermediate layer and a cover formed from cover composition P1 or P2 using a urethane prepolymer having a residual polyisocyanate monomer (free TDI) content of not more than 0.1% was superior in scuff resistance to Comparative Example golf balls Nos. 3 and 4 each having a cover formed from a thermoplastic urethane elastomer or a soft ionomer. In spite of the fact that Example golf ball No. 9 was in common with Comparative Example golf balls Nos. 3 and 4 as to core composition, core diameter, core surface hardness and deformation amount, Example golf ball No. 9 exhibited a higher shot angle and a longer flight distance when hit with a wood or an iron than Comparative Example golf balls Nos. 3 and 4. Further, Example golf ball No. 9 exhibited an adequate spin rate (about 7000 rpm) when hit with a sand wedge. This tendency holds true for other Example golf balls. That is, any one of Example golf balls Nos. 1 to 9 was capable of ensuring a high shot angle and a long flight distance when hit with a wood and an iron both while exhibiting an adequate spin rate as large as about 7000 rpm when hit with a sand wedge.

Any one of Comparative Example golf balls Nos. 1 and 2 each having a cover of a polyurethane, which however was prepared using a urethane prepolymer having a residual polyisocyanate monomer (free TDI or free MDI) content of more than 0.1%, exhibited an inferior scuff resistance. Further, these Comparative Example golf balls each exhibited a slightly larger spin rate, a somewhat lower shot angle and a somewhat shorter flight distance than Example golf ball No. 9 having an identical core with those of Comparative Example golf balls Nos. 1 and 2.

Comparative Example golf ball No. 5 having a polyurethane cover formed using a urethane prepolymer having a residual polyisocyanate monomer (free TDI) content of less than 0.1% exhibited an excellent scuff resistance as did Example golf balls. However, since Comparative Example golf ball No. 5 had a single-layered core, it exhibited a larger spin rate when hit with any one of wood, iron and sand wedge and a shorter flight distance when hit with wood or iron than Example golf balls Nos. 3 to 5 each having a core which was equal in diameter and substantially equal in hardness to Comparative Example golf ball No. 5 but was of a double-layered structure.

This application is based on Japanese Application Serial No. 2000-402502 filed in Japanese Patent Office on Dec. 28, 2000, the contents of which are hereby incorporated by reference.

While only certain preferred embodiments of the present invention have been described in detail, as will be apparent for those skilled in the art, certain changes and modifications may be made in embodiment without departing from the spirit and scope of the present invention as defined by the following claims.

What is claimed is:

1. A solid golf ball comprising:

a solid core comprising a solid center made from vulcanized rubber and an intermediate layer covering the solid center; and a cover covering the solid core, wherein the solid center is a vulcanized rubber sphere having an outer diameter of from 30.0 to 41.0 mm and a difference of not less than 10 in Shore D hardness between a central portion thereof and a surface portion thereof, and deforms from 2.80 to 6.00 mm by compression on condition that an initial load of 10 kgf is increased to an ultimate load of 130 kgf;

the solid core has an outer diameter of from 39.0 to 41.8 mm, deforms from 2.70 to 3.50 mm by compression on condition that an initial load of 10 kgf is increased to an ultimate load of 130 kgf;

the cover has an outermost layer made from polyurethane obtained by curing a composition comprising an isocyanate group-terminated urethane prepolymer and an aromatic polyamine curing agent, the isocyanate group-terminated urethane prepolymer having a residual polyisocyanate monomer content of not more than 0.1% by mass and the polyurethane has a Shore D hardness of from 35 to 60; and the golf ball deforms from 2.50 to 3.30 mm by compression on condition that an initial load of 10 kgf is increased to an ultimate load of 130 kgf.

2. The solid golf ball according to claim 1, wherein the aromatic polyamine curing agent is 4,4'-diaminodiphethylmethane represented by the formula:

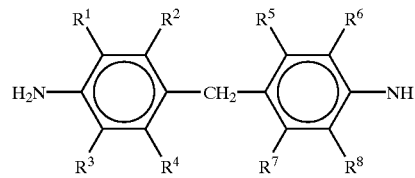

where $R^1$ to $R^8$ each represent any one of an alkyl group having 1 to 9 carbon atoms, a halogen atom, a hydrogen atom, and a derivative thereof.

3. The solid golf ball according to claim 1, wherein the aromatic polyamine curing agent is 2,2'-dichloro-3,3',5,5'-tetraethyl-4,4'-diaminodiphenylmethane.

4. The solid golf ball according to claim 1, wherein the isocyanate group-terminated urethane prepolymer is one selected from the group consisting of a TDI-type urethane prepolymer, an MDI-type urethane prepolymer and a hydrogenated MDI-type urethane prepolymer.

5. The solid golf ball according to claim 1, wherein the intermediate layer is an ionomer.

6. The solid golf ball according to claim 1, wherein the intermediate layer is a thermoplastic elastomer.

7. The solid golf ball according to claim 1, wherein the solid center has an outer diameter of from 32.0 to 40.8 mm.

8. The solid golf ball according to claim 1 wherein the solid center has a Shore D hardness of 25 to 40 at the central portion thereof.

9. The solid golf ball according to claim 1, wherein the solid center has a Shore D hardness of 35 to 50 at the surface thereof.

10. The solid golf ball according to claim 1, wherein the solid center deforms from 2.90 to 5.5 mm by compression on condition that an initial load of 10 kgf is increased to an ultimate load of 130 kgf.

11. The solid golf ball according to claim 1, wherein the solid core has an outer diameter of from 39.6 to 41.0 mm.

12. The solid golf ball according to claim 1, wherein the solid core deforms from 2.80 to 3.40 mm by compression on condition that an initial load of 10 kgf is increased to an ultimate load of 130 kgf.

13. The solid golf ball according to claim 1, wherein the golf ball deforms from 2.60 to 3.20 mm by compression on condition that an initial load of 10 kgf is increased to an ultimate load of 130 kgf.

* * * * *